UNITED STATES PATENT OFFICE.

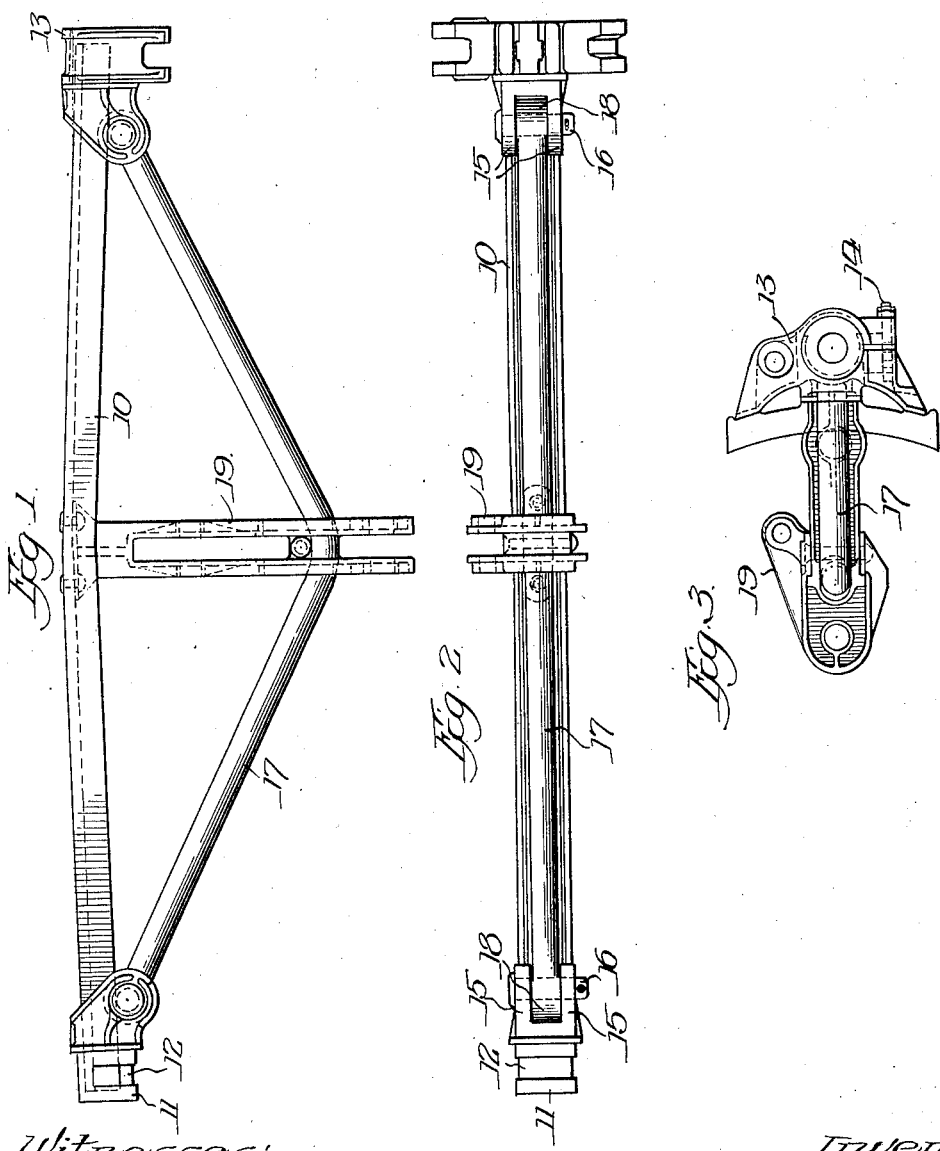

WILLIAM C. HEDGCOCK, OF HAMMOND, INDIANA, ASSIGNOR TO SIMPLEX RAILWAY APPLIANCE COMPANY, OF CHICAGO, ILLINOIS, A CORPORATION OF DELAWARE.

BRAKE-BEAM.

1,093,851.  Specification of Letters Patent.  Patented Apr. 21, 1914.

Application filed August 14, 1913. Serial No. 784,694.

*To all whom it may concern:*

Be it known that I, WILLIAM C. HEDGCOCK, a citizen of the United States, and resident of Hammond, in the county of Lake and State of Indiana, have invented certain new and useful Improvements in Brake-Beams, of which the following is a specification.

My invention relates to brake beams and has particular reference to a novel connection between the tension and compression members of such a beam.

An object in the construction of brake beams at the present time is to produce a beam which shall be exceedingly stiff whereby to provide maximum load capacity with minimum deflection. In the present construction the beam is so arranged that there is no possibility of deflection due to loose connection of the parts.

Furthermore, an object in the construction of brake beams as well as all other devices of this sort is to produce a beam of maximum utility at low cost. By eliminating the work of threading the ends of the tension member and supplying a nut therefor some of the cost of production is cut down.

A further object is to produce a beam which shall be of minimum size at the end where the tension and compression members usually join. This is accomplished by terminating the tension member at a point inside the brake beam instead of extending the tension member through the brake head or through the sleeve which carries the brake head. Likewise, by terminating the tension member at a point inside the upper head the weight of the tension rod which would ordinarily occupy such space is eliminated.

My invention will be more readily understood by reference to the accompanying drawings, wherein, Figure 1 is a plan view of a brake beam constructed in accordance with my invention; Fig. 2 is an edge elevation of the same, and, Fig. 3 is an end elevation thereof.

Referring more particularly to the drawings it will be seen that I provide a compression member 10, preferably channel shaped, the ends of the channel member terminating in a socket in a sleeve 11, this sleeve being provided with an arc-shaped groove 12, which groove provides a seat for a wedge member carried by the brake head 13, which member is actuated by a bolt 14, to lock the head in adjusted position on the sleeve. The sleeve 11 is provided with a pair of rearwardly extending lugs 15, apertured to accommodate a pin 16. This pin forms the connecting means between the sleeve and the tension rod 17, the rod being provided with an eye 18, at either end through which the pin is projected. A strut 19, of approved form, separates the tension and compression members at the middle thereof. In the practice of constructing these brake beams the sleeves are placed on the ends of the beam and the assembled parts placed in a machine, whereby a slight camber is given to the beam and an initial tension is placed therein, sufficient to enable the placing of the tension rod with its connecting pins. When the pressure is released upon the channel beam the initial tension therein maintains a rigid connection between the assembled parts.

It will be seen that a beam constructed as described is very simple, has no parts which can become lost and is extremely rigid. It is obvious also that modifications may be made in the construction shown and such modifications as are within the scope of my claims I consider within the spirit of my invention.

I claim:

1. In a brake beam, the combination of a compression member, a rod tension member having eyes in the ends thereof, sleeves fitted on the ends of said compression members and united by pins to said tension member, and brake heads rotatably mounted on said sleeves, substantially as described.

2. In a brake beam, the combination of a channel shaped compression member, and a round rod tension member having eyes in its ends, sleeves fitted to the ends of said compression member, said sleeves having apertured ears, pins connecting said tension member to said sleeves, and brake heads rotatably mounted on said sleeves, substantially as described.

WILLIAM C. HEDGCOCK.

Witnesses:
EUGENE S. HOOPER,
AUGUST C. RIECHERS.

Copies of this patent may be obtained for five cents each, by addressing the "Commissioner of Patents, Washington, D. C."